United States Patent
Wojtowicz et al.

(10) Patent No.: US 6,869,580 B2
(45) Date of Patent: Mar. 22, 2005

(54) PYROLYSIS-BASED FUEL PROCESSING METHOD AND APPARATUS

(75) Inventors: Marek A. Wojtowicz, Simsbury, CT (US); Michael A. Serio, Sturbridge, MA (US); Erik Kroo, Glastonbury, CT (US); Eric M. Suuberg, Barrington, RI (US)

(73) Assignee: Advanced Fuel Research, Inc., East Hartford, CT (US)

( * ) Notice: Subject to any disclaimer, the term of this patent is extended or adjusted under 35 U.S.C. 154(b) by 569 days.

(21) Appl. No.: 09/900,678

(22) Filed: Jul. 6, 2001

(65) Prior Publication Data

US 2002/0041986 A1 Apr. 11, 2002

Related U.S. Application Data

(60) Provisional application No. 60/216,888, filed on Jul. 7, 2000.

(51) Int. Cl.$^7$ .............................. C01B 3/24; H01M 8/06
(52) U.S. Cl. ................................ 423/437.2; 423/418.2; 423/650; 429/19; 429/13
(58) Field of Search .............................. 429/19–20, 22, 429/13–14; 252/373; 423/437.2, 418.2, 445 R, 648.1, 650

(56) References Cited

U.S. PATENT DOCUMENTS 6,395,197 B1 * 5/2002 Detering et al. ............ 252/373

* cited by examiner

*Primary Examiner*—Michael Barr
*Assistant Examiner*—Monique Wills
(74) *Attorney, Agent, or Firm*—Ira S. Dorman

(57) ABSTRACT

The method for generating a hydrogen-rich stream from hydrocarbon fuels, ultimately to produce hydrogen gas, involves the following two steps performed in a cyclic fashion: (1) pyrolysis of the hydrocarbon fuel to obtain a carbon-rich fraction and a hydrogen-rich fraction; and (2) oxidation of the carbon-rich fraction, or a portion of it, for heat generation. The method involves the following optional steps: (3) steam gasification of part of the carbon-rich fraction to produce additional amounts of hydrogen and carbon monoxide; (4) water-gas shift reaction to convert carbon monoxide to carbon dioxide with the simultaneous formation of additional amounts of hydrogen; and (5) steam reforming of light hydrocarbons that may be produced in step (1) to produce more hydrogen and carbon monoxide.

9 Claims, 2 Drawing Sheets

PYROLYSIS-BASED FUEL PROCESSING METHOD AND APPARATUS

CROSS-REFERENCE TO RELATED APPLICATION

This application claims the benefit of U.S. Provisional Application No. 60/216,888, filed Jul. 7, 2000, in the names of the inventors designated herein and bearing the same title.

STATEMENT REGARDING GOVERNMENT INTEREST

The United States Government has rights in this invention under National Science Foundation grant No. DMI-9632781.

BACKGROUND OF THE INVENTION

Fuel cells which are currently of commercial interest operate on streams of pure or nearly pure hydrogen, which is not readily available in most vehicles. Neither is a source of pure hydrogen convenient or safe to carry on board commercial trucks, buses or other vehicles. However, liquid hydrocarbons, such as diesel fuels, are easily available and their handling, storage and distribution are well developed. Consequently, the large-scale use of fuel cells is expected to require conversion of liquid fuels into a stream of pure hydrogen or hydrogen/$CO_2$ mixtures, with only trace amounts of CO or sulfur impurities. This conversion will require a multi-step process to be carried out on board vehicles.

Dramatic progress has been observed in fuel-cell technologies in recent years. A prototype fuel cell-powered bus has been built by Ballard Power Systems for Vancouver's BC Transit. In this bus, compressed hydrogen is used to fuel the cells, which has raised concerns about passengers' safety. In a different venture, Argonne National Laboratory has built three prototype buses running on fuel cells. These vehicles operate with the diesel engine replaced by an electric engine, a phosphoric-acid fuel cell, and an on-board reformer. The role of the reformer is to convert liquid methanol into hydrogen in situ, and thus to avoid the necessity of carrying pressurized hydrogen. It is interesting to note that Argonne's fuel cell and the reformer are not much larger than the diesel engine they replaced. The fact that methanol is not currently a widely used fuel poses obvious limitations. There are also concerns related to long-term viability as well as corrosiveness and toxicity of methanol.

The development of an on-board system capable of converting hydrocarbon fuels, such as gasoline, diesel, JP-5, natural gas, etc., into a stream of hydrogen-rich gas would make it possible to power vehicles using standard fuels in combination with fuel cells. This would greatly accelerate the introduction of fuel-cell technologies into mass transit and help reduce air pollution in urban centers (particulates, $NO_x$, CO, and unburned hydrocarbons). The advantage of on-board fuel processing is clear: the utilization of conventional fuels at improved efficiency, lower pollution levels, and zero noise.

Partial Oxidation—One current approach to the conversion of standard liquid fuels into hydrogen is partial oxidation (POX) of the liquids to produce soot, carbon oxides and hydrogen. The reaction is normally carried out without a catalyst in the temperature range 1100–1500° C. This technology is similar to the process used in the manufacture of carbon black (Austin, G. T., *Shreve's Chemical Process Industries*, Fifth edition, McGraw-Hill, New York, 1984). A number of projects are currently under way in which fuel processors based on partial oxidation are being developed (*Preprints of the Annual Automotive Technology Development Contractors' Coordination Meeting, PNGV Workshop on Fuel Processing for Proton Exchange Membrane (PEM) Fuel Cells*, Dearborn, Mich., 23–27 Oct., 1995, Office of Transportation Technologies, U.S. Department of Energy, Washington, D.C., 1995; *Preprints of the Annual Automotive Technology Development Contractors' Coordination Meeting*, vol. I, Dearborn, Mich., 23–27 Oct., 1995; "Recent Advances in Fuel Cells," M. A. Wójtowicz, Symposium Organizer, in *ACS Div. of Fuel Chemistry Prepr.* 44 (4), pp. 972–997, 1999; "Hydrogen Production, Storage, and Utilization," C. E. Gregoire-Padro and F. S. Lau, Symposium Organizers, in *ACS Div. of Fuel Chemistry Prepr.* 44 (4), pp. 841–971, 1999). The advantages of partial oxidation include simplicity, exothermicity of the process, sulfur tolerance, rapid start-up, rapid response to load changes, and compactness. However, partial oxidation produces relatively small amounts of gaseous hydrogen, which is diluted with nitrogen, large amounts of carbon oxides and soot, and the efficiency of fuel utilization is relatively low.

Steam Reforming—A second approach is based on steam reforming of hydrocarbon fuels according to the following reaction:

$$C_nH_m + nH_2O \longrightarrow nCO + (n+m/2) H_2 \qquad (A)$$

wherein n and m are typically in the range 1–20 and 4–42, respectively.

Since the above reaction is endothermic, the unreacted hydrogen from the fuel cell is usually burned to provide process heat. The reaction occurs over a catalyst in the temperature range 700–1000° C.

Since proton-exchange membrane (PEM) fuel cells, which are typically used in transportation applications, are intolerant to carbon monoxide, the latter species present in the product gas is often shifted to carbon dioxide according to the following reaction:

$$CO + H_2O \longleftrightarrow CO_2 + H_2 \qquad (B)$$

Shift conversion is usually carried out in two stages: a high-temperature stage followed by a low-temperature stage. The former stage promotes high reaction rates, whereas the low-temperature stage increases the yield. Since the water-gas shift reaction is exothermic, inter-stage cooling is often implemented. In high-temperature fuel cells, CO can be oxidized to $CO_2$ directly, and no shift reaction is necessary.

Steam reforming is a well-established large scale technology, but design, construction, and operation of compact reformers is quite a challenge. Common feedstocks for steam reforming are natural gas, propane and butane. The use of heavier feedstocks, such as naphtha, is difficult, and this problem can be only partly alleviated by the use of specially prepared catalysts (Austin, G. T., *Shreve's Chemical Process Industries*, Fifth edition, McGraw-Hill, New York, 1984). In most cases, a desulfurization step is required upstream of the reformer to protect catalyst beds from deactivation.

Autothermal Reforming—Autothermal reforming (ATR) is a hybrid approach involving endothermic steam reforming combined with partial oxidation for heat generation. The fuel is mixed with a mixture of steam and air, preheated, and fed into a catalytic reactor. Proper control of the steam-to-fuel ration is required to avoid coke formation, and the reaction usually occurs at 650–700° C. The effluent is typically sent to a shift reactor prior to entering the fuel cell. The advantages of ATR include compactness, and nitrogen dilution is the main disadvantage. The efficiency of ATR is lower than that of steam reforming but higher than POX.

SUMMARY OF THE INVENTION

Figure 1:
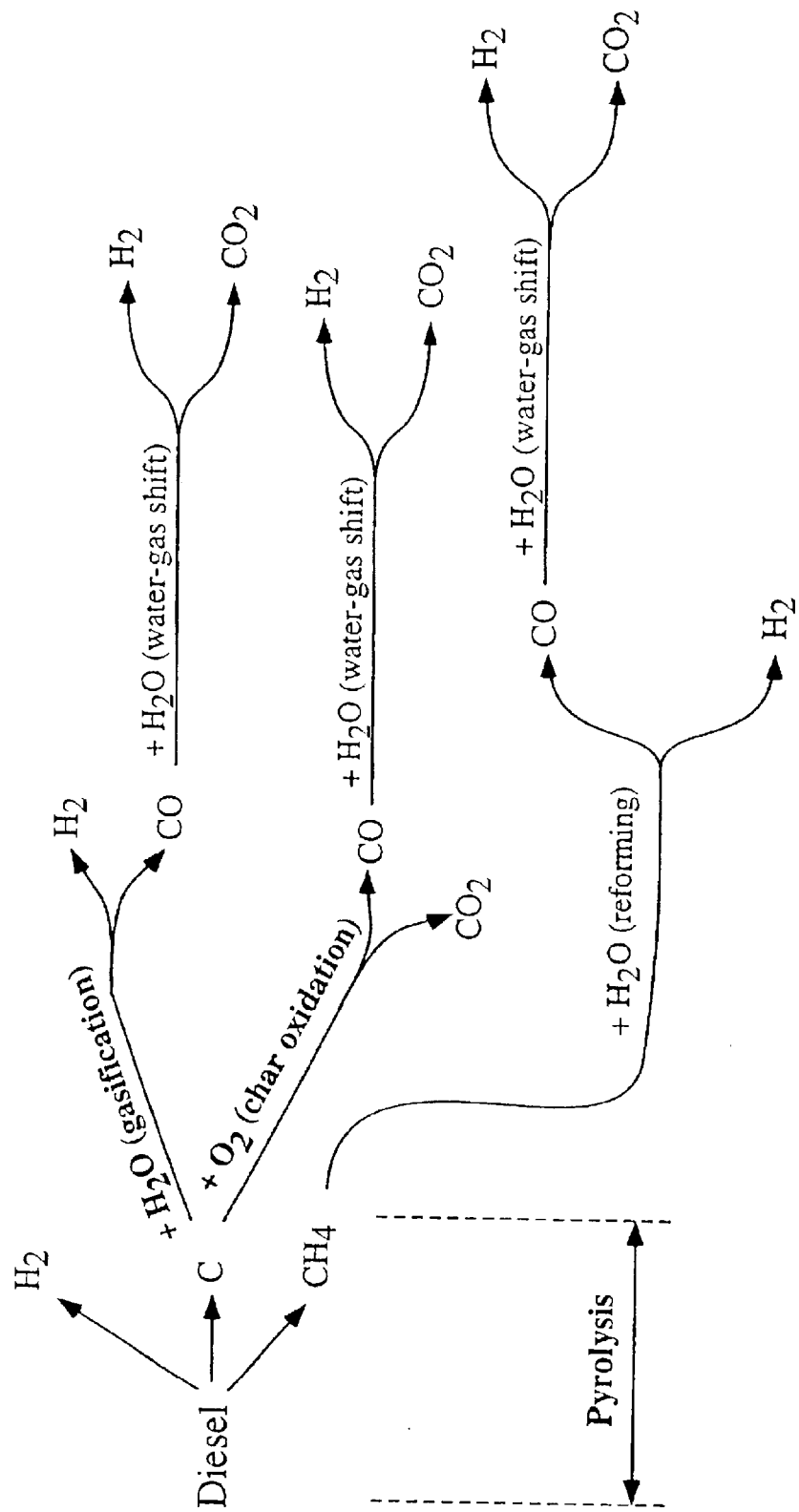
FIG. 1 is a diagram providing an overview of a reaction scheme embodying the present invention.

It is a broad object of the present invention to provide a novel method for producing a stream of hydrogen-rich gas, and thereby for producing hydrogen gas, from a hydrocarbonaceous material.

It is also an object of the invention to provide a power system wherein hydrogen gas for use in a fuel cell is produced from a hydrocarbonaceous material, and wherein the system may be self-contained and implemented in a transport vehicle.

It has now been found that certain of the foregoing and related objects of the invention attained by the provision of a method for producing hydrogen gas from a hydrocarbonaceous material, using reaction apparatus that includes means for absorbing and releasing thermal energy and having a heat-transfer surface. The method comprises the following steps, carried out cyclically:

(a) bringing a quantity of a hydrocarbonaceous material into contact with the surface of the means for absorbing and releasing thermal energy, heated to a temperature $T_{max}$, to effect pyrolysis thereof and thereby to produce quantities of solid carbon-rich residue and hydrogen gas;

(b) effecting combustion of at least a first portion of the quantity of the carbon-rich residue produced in the pyrolysis step; and (c) utilizing at least a portion of the thermal energy produced in the combustion step to heat the means for absorbing and releasing thermal energy to $T_{max}$, for effecting the pyrolysis step in the next succeeding cycle of the method.

The method will preferably include the additional step of (d) effecting steam gasification of a second portion of the solid carbon-rich residue produced in the pyrolysis step and deposited on the heat transfer surface. In accordance therewith, steam may be introduced into the reaction apparatus subsequent to the pyrolysis step, for reaction with the second portion of the carbon-rich residue to effect the steam gasification step, with the sensible heat of the means for absorbing and releasing thermal energy supplying the heat necessary; the portion of thermal energy produced in the combustion step and used for heating the means for absorbing and releasing thermal energy would, in such instances, be sufficient to supply the energy necessary for both the pyrolysis step and also the steam gasification step.

In most embodiments of the method a quantity of carbon monoxide is produced, directly or indirectly, from the hydrocarbonaceous material, and the method desirably includes the additional step of (e) effecting a water-gas shift reaction, utilizing at least a portion of the quantity of carbon monoxide produced, so as to produce carbon dioxide and an additional quantity of hydrogen gas. The method may also include the additional step of (f) effecting steam reforming of gaseous hydrocarbons produced in the pyrolysis step, preferably using thermal energy produced in the combustion step. The means for absorbing and releasing thermal energy may comprise a bed of a catalyst that is effective for promoting pyrolysis of the hydrocarbonaceous material.

Other objects of the invention are attained by the provision of a power system comprising a fuel cell, which utilizes hydrogen for power generation, and reaction apparatus for producing hydrogen gas, operatively connected for delivering hydrogen gas produced thereby to the fuel cell. The reaction apparatus employed will include: means for absorbing and releasing thermal energy and having a heat transfer surface; means for introducing a hydrocarbonaceous material into the apparatus and for depositing the material upon the heat transfer surface thereof, for effecting pyrolysis of the material; and means for introducing an oxygen-containing gas into the apparatus for effecting combustion of carbon produced by pyrolysis of the deposited hydrocarbonaceous material, and for thereby delivering thermal energy to the means for absorbing and releasing thermal energy.

In preferred embodiments the system will be self-contained, and will additionally include means for storing a supply of hydrocarbonaceous material, operatively connected to the means for introducing. Such a system may be part of a transportation vehicle.

DETAILED DESCRIPTION OF THE PREFERRED EMBODIMENTS

The fuel-conversion process is divided into several phases that preferably take place in the same reactor. The reactor mass, including packing (which will preferably comprise a catalyst bed), is used as a heat-transfer medium in such a way that the heat required by endothermic reactions is provided from preceding exothermic cycles. Thus, the reactor mass, which may comprise the reactor walls, catalyst bed, refractory liners, any suitable packing that increases the thermal capacity of the system, etc., constitutes the means for absorption and release of heat. The operation of the fuel processor is described in steps a–d below. FIG. 1 provides an overview of reaction pathways.

At a cold start (not included in FIG. 1), the fuel is burned with air within the reactor volume until the maximum temperature of the reactor mass $T_{max.}$ is reached. The exhaust gases from this cycle are discarded. As an alternative, a rapid start-up could be achieved by the initial heating of the reactor with a hydrogen flame. The hydrogen needed for start-up would be stored in a small hydrogen reservoir.

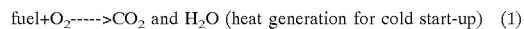

fuel+$O_2$----->$CO_2$ and $H_2O$ (heat generation for cold start-up)  (1)

or

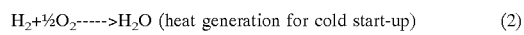

$H_2$+½$O_2$----->$H_2O$ (heat generation for cold start-up)  (2)

It should be noted that any other suitable way of warming up the reactor can be used, which will be apparent to those skilled in the art.

a) In the next step, the air supply is cut off and the fuel is thermally or catalytically cracked (pyrolyzed) on hot reactor surfaces to produce carbon and hydrogen as the main products. Some quantities of light hydrocarbons (mostly methane) and a heavy-hydrocarbon deposit are also formed. An optimal product distribution would be carbon and hydrogen, with only small amounts of light and heavy hydrocarbons. If the amount of light hydrocarbons produced is small, the product gases could be utilized by the fuel cell directly. Otherwise, a reforming step may be desirable to convert light hydrocarbons to hydrogen.

$$\text{fuel} \longrightarrow H_2 + C + C_{-4} + \text{heavy HC's (fuel pyrolysis)} \quad (3)$$

$$C_{-4} + H_2O \longrightarrow H_2 + CO \text{ (reforming)} \quad (4)$$

where $C_{-4}$ denotes light hydrocarbons with four or fewer carbon atoms, and HC's stands for hydrocarbons.

In step (b), temperature drops from $T_{max}$ to $T_1$.

b) The next step involves endothermic steam gasification of the carbon-rich deposit to produce CO and $H_2$. The heat for this reaction is provided by the hot reactor core, or the catalyst bed, the temperature of which drops from $T_1$ to $T_{min}$.

$$C + \text{heavy HC's} + H_2O \longrightarrow H_2 + CO \text{ (steam gasification)} \quad (5)$$

Before entering the fuel cell, the gaseous effluent may be treated with steam in a shift reactor to produce carbon dioxide and more hydrogen:

$$CO + H_2O \longrightarrow CO_2 + H_2 \text{ (water-gas shift)} \quad (6)$$

In principle, the water-gas-shift reaction may occur inherently during the gasification step if excess amounts of steam are present in the system. Through proper design, the water-gas-shift reaction may be integrated with the gasification step and take place within the same reactor. The water-gas shift reaction is mildly exothermic.

c) In the last cycle, the reactor core temperature is raised back to $T_{max}$ by burning the remaining carbon in air or oxygen.

$$C + \text{heavy HC's} + O_2 \longrightarrow CO_2 + CO \text{ (combustion)} \quad (7)$$

The exhaust gases of this cycle may be discarded, or the CO may be shifted to $CO_2$ and additional hydrogen via reaction 6.

Stages (b), (c), and (d) will be referred to as pyrolysis (or fuel cracking), gasification, and oxidation (or carbon burnout, or combustion), respectively.

It should be appreciated that the above steps may be carried out in a single reactor or in multiple reactors. For example, fuel pyrolysis, steam gasification, and residue combustion may take place in the same reactor, whereas the water-gas shift reaction is implemented in a separate reactor. In certain embodiments of the invention, however (such as to provide a self-contained installation or transport vehicle), all the above steps will desirably (or necessarily) be integrated within a single reactor system.

It should also be pointed out that fuel pyrolysis (reaction 3) and the combustion of the carbon-rich residue (reaction 7) are the necessary steps of the process, whereas the remaining steps are optional albeit, to a greater or lesser extent, preferred. In general, the inclusion of the gasification step, steam reforming, and water-gas shift increases the efficiency of the fuel processor at the expense of increased system complexity. In addition, it should be noted that:

$T_{min}$ is generally determined by the condition that enough carbon-rich deposit must be left so that the temperature can be raised again to $T_{max}$ in the carbon burnout step d. Another constraint on $T_{min}$ is of a kinetic nature: if the temperature drops too much, the steam gasification reaction becomes unacceptably slow, and the reactor temperature has to be raised.

The above scheme can be implemented with and without catalysts.

The process can be used for the processing of gaseous, liquid, solid, and mixed hydrocarbon feedstocks.

The products of the exothermic step (combustion) can be completely discarded, thereby reducing the load on the water-gas shift reactor. The secondary processing can be further simplified if thorough cracking of the fuel to carbon and hydrogen can be effected, with only negligible amounts of light hydrocarbon gases produced. In such a case, the steam-reforming step is unnecessary. On the other hand, the utilization of the water-gas shift and $C_4$ reforming steps leads to improved system efficiency. High flexibility of the proposed process will be appreciated.

The use of multiple cycles involving high temperatures is thought to be feasible. It should be noted that the internal-combustion engine does involve multiple strokes occurring at high frequencies, high pressures, and at elevated temperatures. It is expected that the engineering of the fuel processor can be readily handled by those skilled in the art.

An example of a reaction scheme embodying the invention is shown in FIG. 1 for the case of diesel processing at about 1100° C. At this temperature, the main pyrolysis products are found to be hydrogen, carbon residue (mostly carbon), and methane. Simplified reaction stoichiometry is given below.

Diesel Pyrolysis:

$$C_n H_m \xrightarrow{\Delta} x H_2 + \frac{m-x}{4} CH_4 + \left(n - \frac{m-x}{4}\right) C \quad (8)$$

Char Gasification:

$$p\left(n - \frac{m-x}{4}\right)C + p\left(n - \frac{m-x}{4}\right)H_2O \rightarrow \quad (9)$$
$$p\left(n - \frac{m-x}{4}\right)H_2 + p\left(n - \frac{m-x}{4}\right)CO$$

Char Combustion:

$$q(1-p)\left(n - \frac{m-x}{4}\right)C + q(1-p)\left(n - \frac{m-x}{4}\right)O_2 \rightarrow \quad (10a)$$
$$q(1-p)\left(n - \frac{m-x}{4}\right)CO_2$$

$$(1-q)(1-p)\left(n - \frac{m-x}{4}\right)C + \frac{1-q}{2}(1-p)\left(n - \frac{m-x}{4}\right)O_2 \rightarrow \quad (10b)$$
$$(1-q)(1-p)\left(n - \frac{m-x}{4}\right)CO$$

Water-gas Shift (CO from Char Gasification):

$$yp\left(n - \frac{m-x}{4}\right)CO + yp\left(n - \frac{m-x}{4}\right)H_2O \rightarrow \quad (11a)$$
$$yp\left(n - \frac{m-x}{4}\right)H_2 + yp\left(n - \frac{m-x}{4}\right)CO_2$$

$$(1-y)p\left(n - \frac{m-x}{4}\right)CO \rightarrow (1-y)p\left(n - \frac{m-x}{4}\right)CO \quad (11b)$$

Methane Reforming:

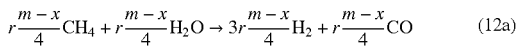

Water-gas Shift (CO from Methane Reforming):

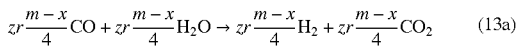

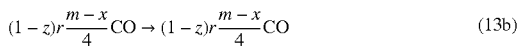

Water-gas Shift (CO from Char Combustion):

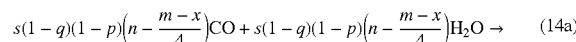

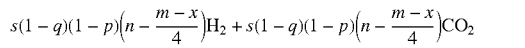

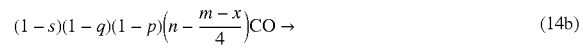

Notation p—fraction of char gasified
(1–p)—fraction of char combusted

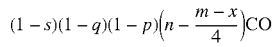

y—fraction of gasification CO shifted
s—fraction of combustion CO shifted
r—fraction of CH$_4$ reformed
z—fraction of CO from CH$_4$ reforming shifted Overall Reaction Stoichiometry

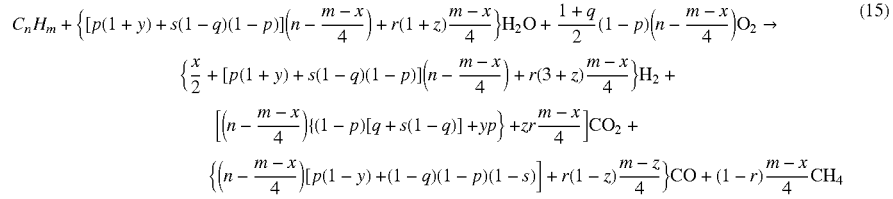

Specific advantages of the system of the invention include:

The pyrolysis step "splits" the original hydrocarbon feedstock (e.g., diesel fuel) into a carbon-rich fraction (solid and/or heavy liquid) and a hydrogen-rich fraction (gas). The separation of these fractions occurs spontaneously.

The heat-generating step involves combustion of the carbon-rich fraction, without the loss of hydrogen. This is in contrast to the POX and ATR reactors where carbon and hydrogen are combusted indiscriminately. This selectivity in the heat generating step leads to superior efficiency of the process as compared with POX and ATR reactors.

The stream of hydrogen-rich gas resulting from the process is either undiluted or the level of nitrogen dilution is lower than in the case of POX and ATR.

The steam-gasification of the carbon residue is an additional source of hydrogen originating from water. This source of hydrogen is not present in POX and ATR processes.

The water-gas shift reaction also produces additional amounts of hydrogen from water. This source of hydrogen is present in the POX and ATR processes.

Yet another source of additional hydrogen is the reforming step in which light hydrocarbons react with steam to produce hydrogen and CO (reaction 4).

A description of experiments carried out to demonstrate the invention is given below. Although the invention can be used in conjunction with diverse hydrocarbon fuels, the experiments described below were performed on diesel fuel, which is probably one of the most challenging fuels to process.

Four bench scale, fixed-bed reactors were designed and constructed, with diameters ranging from 1" to 1.5", and with different designs of the fuel-injection assembly. The experimental system consisted of a tubular reactor, water and diesel injection section, gas manifold, and a gas-analysis section. The entire system was computer controlled, which allowed for automated, unattended operation throughout many cycles.

Each reactor was heated externally using a tube furnace, and furnace temperature and inlet pressure were recorded on a continuous basis. A high-pressure, dual-cylinder metering pump (Eldex A-30-S) was used for fuel delivery, and another metering pump was utilized for water injection. Computer controlled valves provided automatic switching from diesel to water at the end of the diesel-cracking stage. Both pumps were equipped with by-pass loops to ensure smooth, trouble-free operation. A small stream of nitrogen was used to carry the liquid (diesel or water) aerosol into the reactor, and either air or oxygen was used to burn residual carbon in the oxidation stage. The flow of gases at the reactor inlet was controlled by means of computer-interfaced solenoid valves. The flow rate of the gas effluent at the reactor outlet was measured using a digital volumetric flow meter (J&W Scientific model ADM 2000). For flow rates above 1 L/min, a Humonics model 730 bubble meter was used. The latter device was equipped with an electronic bubble counter. Gas analysis was performed using a Fourier transform infrared (FT-IR) analyzer and a gas chromatograph (GC). To establish reproducible, standard conditions for FT-IR gas analyses, a constant, low-flow slip stream (10 ml/min) was withdrawn from the effluent gas, and a digital peristaltic pump was used for this purpose. The slip stream was diluted with nitrogen (1,630 ml/min) before entering a gas cell (On-Line Technologies 20/20™ Multipass Cell maintained at 140° C.) of an FT-IR spectrometer (Bomem MB100). Water was condensed out of the effluent stream using two condensers: one for the main stream, and one for the slip stream. Concentrations of the following species were continuously monitored using FT-IR analysis: CO, CO$_2$, SO$_2$, CH$_4$, and other light hydrocarbons.

Gas chromatographic analysis was performed on gas samples collected in sampling bags. A Carle Series 400 AGC gas chromatograph was used to carry out gas analysis ($H_2$, CO, $CO_2$, $C_1$–$C_5$, and $C_6$ or larger). The instrument was equipped with molecular sieve columns, a thermal conductivity detector (TCD) for the analysis of $H_2$, $CO_2$, CO, and light hydrocarbon gases, and an SRI flame ionization detector (FID) for light hydrocarbons. In addition, a HNU 421 GC was used. It was equipped with a flame-ionization detector (FID) for heavier hydrocarbons and an SRI 110 flame photometric detector (FPD) for sulfur analysis. A Chromosil 330 column was used, and the oven temperature was 40° C.

Experiments involving three main components of the reaction scheme (diesel pyrolysis, steam gasification of the carbon-rich fraction, and combustion of the residue) were conducted and product distributions were determined under different process conditions. An optimum nominal process temperature of 1,100° C. was used in most experiments.

More than 200 pyrolysis-gasification-combustion cycles were performed, and a typical pyrolysis gas composition was found to be 84 mol % $H_2$ and 16 mol % $CH_4$. An average gas composition during gasification was found to be 55 mol % $H_2$, 36 mol % CO, and 9 mol % $CO_2$. The above values do not include small quantities of nitrogen used as a carrier gas to entrain diesel and water aerosol and introduce them into the reactor. It is expected that the need for a carrier gas will be eliminated in the final design of the fuel processor.

Figure 2:
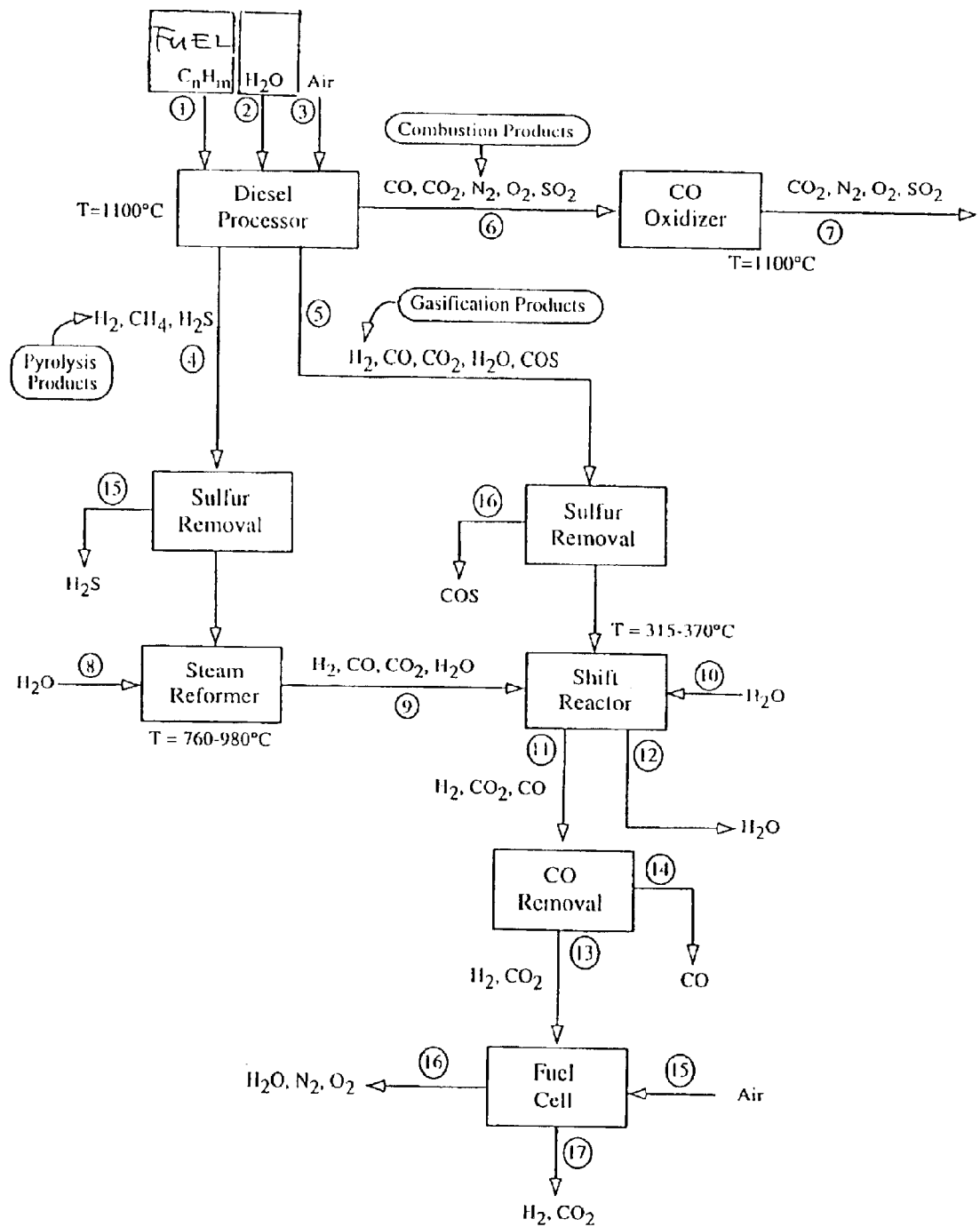
FIG. 2 is a flow diagram of a system embodying the invention, comprising a diesel processor, a fuel cell, and auxiliary components (steam reformer, shift reactor, sulfur and CO removal units, etc.).

Data collected in the above series of experiments were used to produce a flow-sheet design of a diesel-processor unit compatible with a 30 ft (30,000 lb) transit bus, as shown in FIG. 2, which included mass and heat balances. The assumptions and results are discussed below.

It is assumed that a complete carbon conversion to $CO_2$ takes place in the char-combustion step, and the effluent gas (stream No. 7) is discarded. This means that the combustion-generated CO is entirely converted to $CO_2$ to recover the heat of reaction. This may be implemented, for example in a catalytic or non-catalytic CO oxidizer (re-burner). An alternative arrangement, wherein the carbon monoxide resulting from char combustion is directed to the shift reactor so that more hydrogen could be generated, might be employed. This concept would have to involve a CO—$O_2$ separation step, however, to prevent unreacted oxygen from mixing with the hydrogen formed in the shift reactor. Such a step would add unnecessary complexity and cost to the scheme, and the configuration shown in FIG. 2 is, therefore, deemed more advantageous. The CO oxidizer could have the form of a catalytic re-burner, for example, with the heat of CO-to-$CO_2$ oxidation transferred either to the diesel processor directly or to one of its inlet streams (e.g., water, diesel, or inlet air pre-heater) using a heat exchanger. Furthermore, the CO oxidizer could be coupled with, or complemented by, a heat-recovery unit in which excess hydrogen from the outlet of the fuel cell is combusted. (Fuel cells usually operate under 20–25% excess hydrogen to keep the cell well purged and avoid contamination.)

In addition to the steam reformer and the shift reactor, the fuel-processing system is equipped with sulfur and carbon-monoxide removal units to ensure adequate gas purity for the downstream units (the steam reformer, the shift reactor, and the fuel cell). Such units are commonly utilized in fuel-cell systems, and the design or selection of these parts of the system is not the subject of this invention.

System response to transient changes in the feed rate and temperature is an important consideration related to start-up and part-load operation. Rapid start-up should be possible, e.g., by the initial heating of the reactor with a hydrogen flame. A small hydrogen reservoir could be used to store hydrogen for the next cold start-up. Another option would involve the combustion of small amounts of diesel fuel for start-up purposes. Part-load operation could also be facilitated by computer control of cycle characteristics, such as the amount of diesel injected, duration of pyrolysis, gasification, and combustion steps, etc. The use of energy-storage devices, such as flywheels, batteries, or ultracapacitors, is also a possibility.

The basis for the mass-balance computations was a flow of 2,050 mol $H_2$/hr, which is an approximate nominal hydrogen demand of a 30,000 lb transit bus powered with a fuel cell (Fisher, J., "Fuel cell-powered transit bus development," *Preprints of the Annual Automotive Technology Development Contractors' Coordination Meeting*, vol. I, Dearborn, Mich., 23–27 Oct., 1995). Additional assumptions upon which the mass and energy balance computations were performed are listed below.

In the steam-gasification step, a steam-to-carbon ratio of 3.0 (g $H_2O$/g C)=2.0 (mol $H_2O$/mol C) was assumed based on the literature data for steam-gasification processes (Dainton, A. D., "Gasification of Coal," Ch. 7 in Coal and *Modern Coal Processing: An Introduction*, Pitt, G. J. and Millward, G. R., Eds., Academic Press, London, 1979, pp. 133–162; and Van Fredersdorff, C. G. and Elliott, M. A., "Coal Gasification," Ch. 20 in *Chemistry of Coal Utilization, Supplementary Volume*, H. H. Lowry, Ed., John Wiley & Sons, New York, 1963, pp. 892–1022).

In the methane reformer, a steam-to-methane ratio of 3.375 (g $H_2O$/g $CH_4$)=3.0 (mol $H_2O$/mol $CH_4$) was assumed based on the literature data for steam-reforming of methane (Tedder, J. M., Nechvatal, A., and Jubb, A. H., *Basic Organic Chemistry*, Part 5: *Industrial Products*, John Wiley & Sons, London, 1975).

20% excess oxygen in the char-combustion step.

The amount of water in the shift reactor (a sum of $H_2O$ in streams No. 5, 9. and 10) was assumed to be at least 1.5 times the equilibrium value required for the desired CO conversion (80%).

The energy required to heat reactants to reaction temperature was unaccounted for, assuming that most of this heat could be recovered from the products. Although some heat loss is inevitable, it should be borne in mind that additional energy will be available from the fuel cell (an exothermic process), and also from the combustion of excess hydrogen exiting the fuel cell. In addition, the conversion of CO in the shift reactor was assumed to be only 80%, which is very conservative and characteristic of a single-stage shift reactor (Austin, G. T., *Shreve's Chemical Process Industries*, Fifth edition, McGraw-Hill, New York, 1984). The water-gas shift reaction often proceeds nearly to its equilibrium, which is associated with conversions close to, and sometimes in excess of, 90% rather than the assumed 80%.

Results of the mass and energy balance calculations are summarized below.

The fuel requirement for the integrated system consisting of the diesel processor, a shift reactor, and a methane reformer was found to be about 12.5 kg/hr, i.e., approximately 10.4 L/hr (2.61 gal/hr). This corresponds to a hydrogen production of about 2.05 kmol $H_2$/hr (~1.02 kg $H_2$/hr), which is appropriate for a 50 kW fuel cell. The air requirement for the fuel-processor was found to be about 35.4 kg/hr (1.23 kmol/hr). The entire system operates with a water requirement of 22.8 kg/hr (1.27 kmol/hr), i.e., 1.82 kg $H_2O$/kg diesel, but using water available from the fuel-cell exhaust can easily compensate for this deficit. If one includes the fuel cell in the water balance, a surplus of 14.1 kg/hr (0.781 kmol/hr) results. The fuel-processing system can be made thermally neutral, i.e., all the energy required for the process can be generated from diesel fuel. The overall system efficiency (excluding the fuel cell) in excess of 90% was found. The efficiency is defined as a ratio of the lower heating value of the hydrogen produced to the lower heating value of diesel.

The concept was evaluated on the basis of the available data, and comparisons with methanol reforming and partial oxidation were made. The above-described system was found to offer a substantial fuel-economy and operating-cost advantage over the methanol reformer (at least a factor of two). The main advantages over partial oxidizers are a better efficiency (93% versus 83%) and a better quality gas feedstock for fuel cell (78 mol % $H_2$ for the diesel processor versus 43 mol % $H_2$ for a partial oxidizer). The above performance data for partial oxidizers are quoted after Mitchell, W. L., Chintawar, P. S., Hagan, M., He, B.-X. and Prabhu, S. K., "Compact fuel processors for fuel cell electric vehicles (FCEVs)," *ACS Div. of Fuel Chem. Prepr.*, 1999, 44(4), 995–997. The main disadvantage of the pyrolysis-based diesel processing system appears to be its relative complexity.

Thus, it can be seen that the present invention provides a novel method for producing hydrogen gas from a hydrocarbonaceous material. It also provides a power system wherein hydrogen gas for use in a fuel cell is produced from a hydrocarbonaceous material, and wherein the system may be self-contained and implemented in a transport vehicle.

Having thus described the invention what is claimed is:

1. A method for producing hydrogen gas from a hydrocarbonaceous material, using reaction apparatus that includes means for absorbing and releasing thermal energy and having a heat-transfer surface, comprising the following steps, carried out cyclically:
    (a) bringing a quantity of a hydrocarbonaceous material into contact with said heat-transfer surface of said means for absorbing and releasing thermal energy, heated to a temperature $T_{max}$, to effect pyrolysis thereof and thereby to produce quantities of solid carbon-rich residue and hydrogen gas;
    (b) effecting combustion of at least a first portion of said quantity of said carbon-rich residue produced in said pyrolysis step; and
    (c) utilizing at least a portion of the thermal energy produced in said combustion step to heat said means for absorbing and releasing thermal energy to said temperature $T_{max}$, for effecting said pyrolysis step in the next succeeding cycle of said method.

2. The method of claim 1 including the additional step of (d) effecting steam gasification of a second portion of said solid carbon-rich residue produced in said pyrolysis step and deposited on said heat transfer surface.

3. The method of claim 2 wherein, subsequent to said pyrolysis step, steam is introduced into the reaction apparatus for reaction with said second portion of said solid carbon to effect said steam gasification step, and wherein the sensible heat of the means for absorbing and releasing thermal energy supplies the heat necessary for said gasification step, said portion of thermal energy produced in said combustion step and used for heating said means for absorbing and releasing thermal energy being sufficient to supply the energy necessary for both said pyrolysis step and also said steam gasification step.

4. The method of claim 1 wherein a quantity of carbon monoxide is produced, directly or indirectly, from said hydrocarbonaceous material, and wherein said method includes the additional step of (e) effecting a water-gas shift reaction, utilizing at least a portion of said quantity of carbon monoxide produced, so as to produce carbon dioxide and an additional quantity of hydrogen gas.

5. The method of claim 1 including, in said next succeeding cycle, the additional step of (f) effecting steam reforming of gaseous hydrocarbons produced in said pyrolysis step.

6. The method of claim 5 wherein thermal energy produced in said combustion step supplies the energy necessary for effecting said steam reforming step.

7. The method of claim 1 wherein said means for absorbing and releasing thermal energy comprises a bed of a catalyst that is effective for promoting pyrolysis of said hydrocarbonaceous material.

8. A method for producing hydrogen gas from a hydrocarbonaceous material, using reaction apparatus that includes means for absorbing and releasing thermal energy and having a heat-transfer surface, comprising the following steps, carried out cyclically,
    (a) bringing a quantity of a hydrocarbonaceous material into contact with said heat-transfer surface of said means for absorbing and releasing thermal energy, heated to a temperature $T_{max}$, to effect pyrolysis thereof and thereby to produce quantities of solid carbon-rich residue and hydrogen gas;
    (b) effecting combustion of at least a first portion of said quantity of said carbon-rich residue produced in said pyrolysis step;
    (c) utilizing at least a portion of the thermal energy produced in said combustion step to heat said means for absorbing and releasing to said temperature $T_{max}$, for effecting said pyrolysis step in the next succeeding cycle of said method; and
    (d) effecting steam gasification of a second portion of said quantity of carbon-rich residue produced in said pyrolysis step.

9. The method of claim 8 wherein, subsequent to said pyrolysis step, steam is introduced into the reaction apparatus for reaction with said second portion of said solid carbon to effect said steam gasification step, and wherein the sensible heat of the means for absorbing and releasing thermal energy supplies the heat necessary for said gasification step, said portion of thermal energy produced in said combustion step and used for heating said means for absorbing and releasing thermal energy being sufficient to supply the energy necessary for both said pyrolysis step and also said steam gasification step.

* * * * *